Oct. 20, 1970 — G. E. FAAS — 3,535,028

EYEGLASS ASSEMBLIES

Filed Oct. 11, 1967

INVENTOR
GEORGE E. FAAS
BY
Nolte & Nolte
ATTORNEYS

United States Patent Office 3,535,028
Patented Oct. 20, 1970

3,535,028
EYEGLASS ASSEMBLIES
George E. Faas, 650 Johnston Drive,
Watchung, N.J. 07060
Filed Oct. 11, 1967, Ser. No. 674,493
Int. Cl. G02c 7/02
U.S. Cl. 351—61      6 Claims

ABSTRACT OF THE DISCLOSURE

An eyeglass assembly wherein lenses are carried by an eyeglass frame. A lens means constitutes the lenses of the eyeglass assembly and an elastic yieldable frame means carries this lens means. This elastic yieldable frame means resiliently grips the lens means so as to carry and support the latter, and the mounting of the lens means on the frame means is maintained solely and exclusively by the resilient gripping force of the frame means. This elastic yieldable frame means is yieldable to an extent which is sufficient to permit the lens means to be snapped into and out of the frame means while at the same time this frame means has a sufficient elastic gripping force to reliably hold the lens means assembled with the frame means.

BACKGROUND OF THE INVENTION

The present invention relates to eyeglases.

In particular, the present invention relates to structure for mounting eyeglass lenses on the frames of eyeglasses.

At the present time considerable inconvenience is involved in the mounting of eyeglass lenses on eyeglass frames. A particularly great part of this inconvenience resides in the requirement of machining the lenses themselves in order to adapt them to be mounted properly on the frames. In addition, conventional mounting of lenses on frames of eyeglasses requires various fastening devices to be used and a relatively large number of parts to be asembled together, as well as, in some cases, suitable adhesives and the like. Also, it is often required to heat and deform plastic material which thereafter contracts and sets in order to bring about the required mounting of the lenses in a reliable manner on the frames. The result of all these inconveniences is on the one hand that considerable time and labor is involved in the proper mounting of lenses on the frames, there is the danger of unavoidably damaging the lenses, the mounting is not always as reliable as might be desired, and frequently considerably difficulty is involved in removing one lens and replacing it with another in the same frame.

SUMMARY OF THE INVENTION

It is accordingly a primary object of the present invention to provide an eyeglass assembly which will avoid the above drawbacks.

In particular, it is an object of the present invention to provide a construction which will avoid the necessity of machining or other operations of any type on the eyeglass lenses themselves in connection with the mounting thereof on the frame.

Also, it is an object of the present invention to provide a reliable lens mounting on an eyeglass frame without requiring any heating or cooling of the latter, the use of any adhesives, or the use of any assembling components in addition to the frame itself.

Furthermore, it is an object of the present invention to provide an exceedingly simple inexpensive construction which is capable of reliably supporting the lenses while obstructing the vision of the wearer of the eyeglasses to a minimum degree.

Also, it is an object of the present invention to provide a construction which without the use of tools, will enable eyeglass lenses to be readily disassambled from as well as assembled with an eyeglass frame while at the same time providing a highly reliable mounting for the lenses on the frame.

In accordance with the invention the lens means is carried by an elastic yieldable frame means which elastically grips the lenses in order to hold them assembled with the frame means. According to the present invention the mounting of the lenses on the frame means is maintained solely and exclusively by the elastic gripping force of the frame means on the lens means. The frame means has an extent of elasticity which is sufficient to enable the frame means to yield to an extent which enables the lens means to be snapped into and out of the frame means while at the same time the frame means grips the lens means elastically with a force which is sufficiently great to provide for an absolutely reliable assembly of the lenses with the frame.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
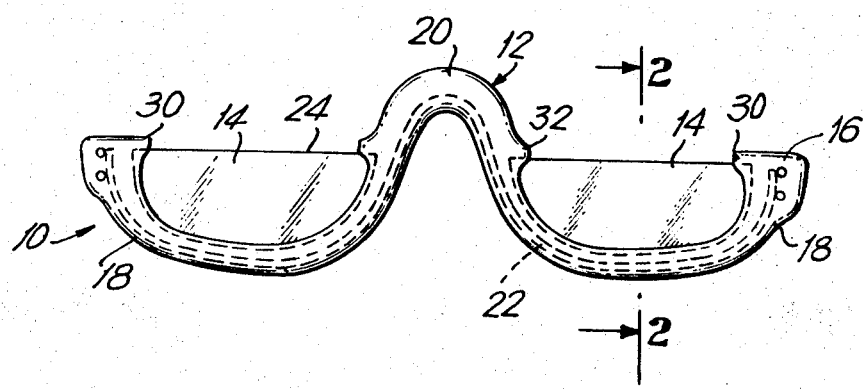
FIG. 1 is a front elevation of one posible embodiment of an eyeglass assembly acording to the invention.

Referring now to the drawings, it will be seen that the eyeglass assembly 10 illustrated therein includes an elastic yieldable frame means 12 and a lens means composed of the pair of transparent lenses 14 which may be made of glass, plastic, or the like. The frame means 12 is in the form of an elongated plastic body 16 made of any suitable well known plastic material which has a certain degree of elasticity and which is capable of resiliently yielding to forces manually applied to the frame. Thus, the frame 16 can be made of any well known plastics such as polyethylene, polyvinylchloride, polystyrene, acetate, etc.

The elongated frame means 12 has the elongated body 16 thereof provided with a pair of lens-carrying portions 18 which are of substantially half-elliptical form, and these portions 18 are interconnected by an integral nosepiece portion 20 adapted to be mounted on the nose of the wearer of the eyeglasses 10 in a conventional manner, the lens-carrying portions 18 and the nosepiece 20 forming a single continuous uninterrupted body 16 which is fabricated by any suitable process.

Although it is possible to achieve with certain plastics a sufficiently great degree of elastic yieldability, the illustrated preferred construction includes an elongated elastic springy metal member 22, in the form of a suitable springy wire or ribbon made of any suitable springy metal such as a suitable spring steel. In a well known manner, the plastic body 16 is fabricated around the springy member 22 which thus becomes embedded within the body 16 and guarantees that the body 16 will have the required elasticity.

It will be noted from FIG. 1 that the lenses 14 have freely exposed upper edges 24 so that they obstruct the vision to a minimum degree. In addition, it will be noted from FIG. 3 as well as FIG. 1 that the lower edges 26 of the lenses 14 have the configuration of a half-ellipse and conform substantially to the configuration of the lens-carrying portions 18 which thus extend along only the lower edge portions 26, which terminate at their upper ends at the outer extremities of the upper edges of the lenses.

The body 16 is, at the upper surface regions of the lens-carrying portion 18, provided with elongated grooves 28 which receive the lower edges 26 of the lenses 14, respectively. Furthermore, it will be noted that at their outer end regions the lens-carrying portions 18 have inwardly extending tips 30 which extend over the upper edges 24 at their outer end regions, while the nosepiece 20 is provided with a pair of opposed inwardly extending projections 32 which extend over the inner end regions of the upper edges 24 of the lenses 14. The grooves 28 extend all the way up to the tips 30 and the projections 32.

Figure 3:
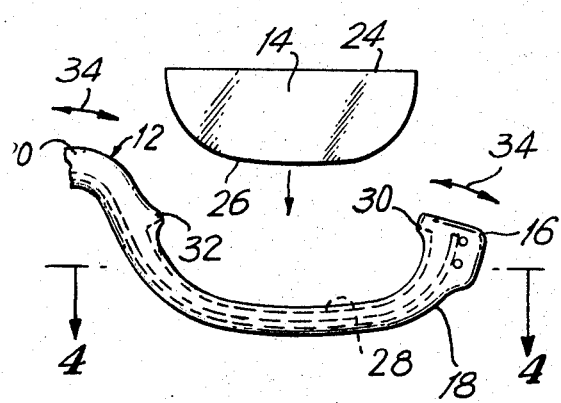
FIG. 3 is a fragmentary front elevation showing the manner in which the lens means and frame means are assembled together.

Thus, with this construction the body 16 can be elastically deflected in the direction indicated by the arrows 34 in FIG. 3 to provide for spreading of the tips 30 away from the projections 32, thus enabling the lenses 14 to be snapped into and out of the grooves 28 whenever desired. The springy force with which the frame means 12 grips the lens means 14 is sufficiently great to provide for reliable maintenance of the lens means 14 assembled with the frame means 12, while at the same time the latter is yieldable, as shown by the arrows 34 in FIG. 3, to an extent which is sufficient to enable the lens means 14 to be snapped into and out of the frame means 12.

Figure 2:
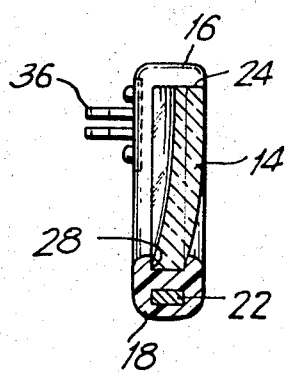
FIG. 2 is a transverse section taken along line 2—2 of FIG. 1 in the direction of the arows.
Figure 4:
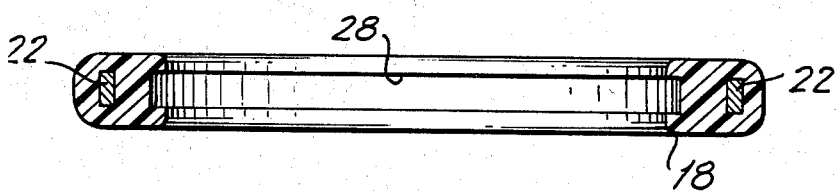
FIG. 4 is a partly sectional plan view taken along line 4—4 of FIG. 3 in the direction of the arrows.

As is apparent from FIG. 2, the outer extremities of the lens-carrying portions 18 fixedly carry at their rearwardly directed surfaces fittings 36 to which side pieces will be pivotally connected in a well known manner.

What is claimed is:

1. In an eyeglass assembly, lens means including a pair of transparent lenses, said lenses respectively having upper and lower edges, said lower edges having upper extremities at opposed ends of said upper edges, and yieldable elastic frame means for carrying and elastically gripping said lens means, said elastic frame means extending along said lower edges and along said upper edges only at end regions thereof adjacent the upper extremities of said lower edges, an elongated springy metallic member embedded in said frame means, said lens means and said frame means being maintained in their assembled condition exclusively by the elastic gripping action of said frame means having said elongated springy metallic member embedded therein, and said frame means being yieldable to an extent sufficient to provide for snapping of said lens means into and out of said frame means while exerting an elastic gripping force sufficient to reliably maintain said lens means mounted on and held by said frame means.

2. The combination of claim 1 and wherein each of said lower edges of said lens means has substantially the configuration of a half ellipse.

3. The combination of claim 1 and wherein said elastic frame means includes an elongated plastic body extending along said lower edges of said lenses and formed at an upper surface region with elongated grooves receiving said lower edges of said lenses.

4. The combination of claim 3 and wherein said elongated plastic body has a pair of lens-carrying portions each of which has an open top end and is substantially of the configuration of a half ellipse, and said lens-carrying portions being joined to each other by a central nosepiece portion of said body which is adapted to be mounted on the nose of the wearer of the eyeglasses.

5. The combination of claim 4 and wherein said lenses have exposed upper substantially horizontal edges which obstruct the vision to a minimum degree.

6. The combination of claim 5 and wherein said plastic body carries at opposed outer ends thereof, situated respectively at the outer extremities of said lens-carrying portions, a pair of fittings for side pieces of the eyeglasses.

References Cited

UNITED STATES PATENTS 3,471,222  10/1969  Eisler _____ 351—61

DAVID SCHONBERG, Primary Examiner

R. L. SHERMAN, Assistant Examiner

U.S. Cl. X.R.

351—106, 129